United States Patent
Jang

[19]

[11] Patent Number: 5,816,974
[45] Date of Patent: Oct. 6, 1998

[54] DEVICE AND METHOD FOR CONTROLLING LINE PRESSURE OF HYDRAULIC CONTROL SYSTEM FOR 4-SPEED AUTOMATIC TRANSMISSION

[75] Inventor: Jaeduk Jang, Kyungki-do, Rep. of Korea

[73] Assignee: Hyundai Motor Co., Rep. of Korea

[21] Appl. No.: 699,909

[22] Filed: Aug. 20, 1996

[30] Foreign Application Priority Data

Aug. 22, 1995 [KR]  Rep. of Korea ...................... 95-25933

[51] Int. Cl.⁶ .............................. F16H 61/58; F16H 61/14
[52] U.S. Cl. ............................ 477/63; 477/162; 477/163
[58] Field of Search .................... 477/158, 162, 477/163, 63

[56] References Cited

U.S. PATENT DOCUMENTS

| | | | |
|---|---|---|---|
| 4,445,401 | 5/1984 | Ishimaru | 477/162 |
| 4,507,985 | 4/1985 | Morimoto et al. | 477/63 |
| 4,539,869 | 9/1985 | Suga et al. | 477/63 |
| 5,303,616 | 4/1994 | Palansky et al. | 477/63 |

*Primary Examiner*—Charles A. Marmor
*Assistant Examiner*—Sherry Lynn Estremsky
*Attorney, Agent, or Firm*—Finnegan, Henderson, Farabow, Garrett & Dunner, L.L.P.

[57] ABSTRACT

A device and a method of a hydraulic control system for 4-speeds automatic transmissions which may reduce line pressure in a steady flow during operation of an automotive vehicle at high speed thereby decreasing the load applied to an oil pump and reducing fuel consumption. And when shifting from the second, third or fourth speed of the "D" range, where the damper clutch operates, to another shift range, which makes it so the line pressure is not changed when the damper clutch is released thereby increasing the load applied to the engine, thereby preventing the run-up of the engine, and when the shift is completed, which changes the line pressure again, thereby improving shift quality and power transmission efficiency.

3 Claims, 5 Drawing Sheets

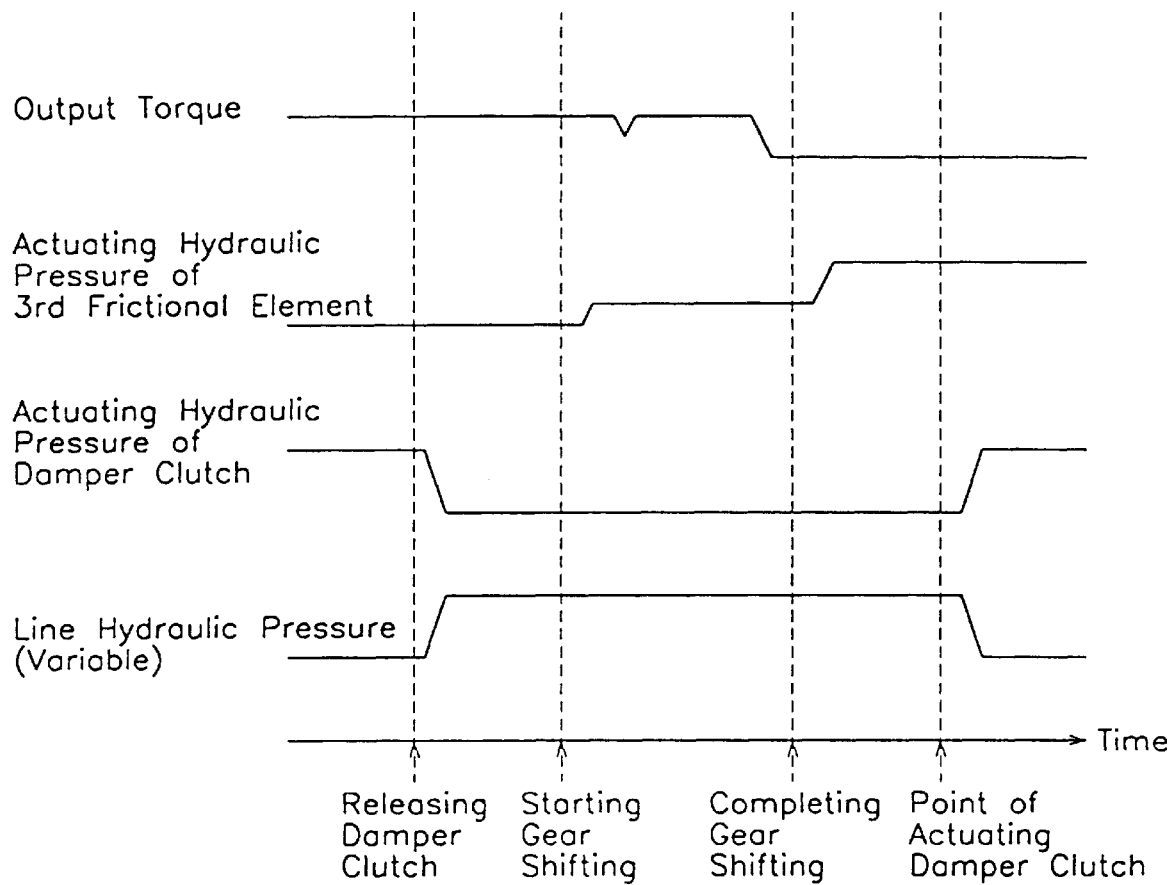

DEVICE AND METHOD FOR CONTROLLING LINE PRESSURE OF HYDRAULIC CONTROL SYSTEM FOR 4-SPEED AUTOMATIC TRANSMISSION

BACKGROUND

The present invention relates to a device and a method for controlling line pressure of a hydraulic control system for 4-speed automatic transmissions.

A commonly used hydraulic control system for 4-speed automatic transmissions is controlled to supply oil pressure according to two shift modes, "D" and "R" ranges. However, much load is applied to the oil pump because it continuously receives unnecessary hydraulic pressure while an automotive vehicle is driven at 3rd or 4th speeds. This results in a waste of the oil pump's driving force which, in turn, gives rise to high fuel consumption.

The present applicant proposed Korean Patent Application No. 94-7337 is entitled "Hydraulic Pressure Control Device of a Hydraulic Control System for 4-Speed Automatic Transmissions".

According to the above-mentioned invention, hydraulic pressure generated from an oil pump has control of a plurality of frictional elements in response to forward and reverse speeds in a manner that a plurality of valves alternatively transmit the rotating force of a torque converter to each gear part. The hydraulic control system includes a damper clutch control valve that varies hydraulic pressure generated from the oil pump to control the application and release of a damper clutch of the torque converter, a torque converter control valve that regularly controls the pressure of the torque converter, and a pressure control valve that varies main control pressure when the speed change gear assembly comes into a neutral "N" driving arrangement, a drive "D", or a reverse "R" arrangement. This system also includes a high-low pressure valve that is controlled by the damper clutch solenoid valve and controls the line pressure of the pressure control valve by the hydraulic pressure supplied from an end clutch, and a reducing valve which is connected to a manual valve whose ports are changed converted by a shift lever and produces regulated pressure lower than the main control pressure.

Hydraulic pressure, remaining stationary in frictional elements actuated at 3rd and 4th speeds and in a predetermined port of the high-low pressure valve through the end clutch valve, is provided to the pressure control valve by the movement of a valve spool of the high-low control valve when the duty ratio of the damper clutch control solenoid valve is controlled to operate the valve spool of the pressure control valve, thereby regulating the main control pressure. In the above pressure control means, the high-low control valve moves simultaneously when the duty ratio of the damper clutch control solenoid valve is controlled, and the regulation of the pressure control valve's pilot control pressure becomes unstable so that control of pressure is not possible.

SUMMARY

The advantages of the invention may be obtained by means of the combinations particularly pointed out in the appended claims. The present invention encompasses a device and a method of a hydraulic control system for 4-speed automatic transmissions which may reduce line pressure in a steady flow during operation of an automotive vehicle at high speeds thereby decreasing the load applied to an oil pump and enhancing the fuel consumption, and when shifting from the second, third or fourth speed of the "D" range where the damper clutch operates, to another shift range, the line pressure is controlled not so as to change when the damper clutch is released thereby increasing the load applied to the engine, thereby preventing the run-up of the engine. And when the shift is completed, the line pressure is controlled so as to change again, thereby improving the shift quality and power transmission efficiency.

The present invention includes a device having a plurality of valves alternately transmitting rotating force of a torque converter to each gear part by controlling a plurality of frictional elements with hydraulic pressure generated from an oil pump in response to forward and reverse speeds, includes a damper clutch control valve varying hydraulic pressure generated from the oil pump to either turn on or turn off a damper clutch of the torque converter, a torque converter control valve regularly controlling the pressure of the torque converter, and a pressure control valve varying line pressure during shifting gears to a neutral "N", drive "D", or reverse "R" range. The device also includes a high-low pressure valve controlled by the damper clutch solenoid valve and line pressure, and is supplied with a part of the hydraulic pressure provided to the frictional elements actuated at 3rd and 4th speeds of the "D" range to regulate the line pressure of the pressure control valve, and a reducing valve connected to a manual valve whose ports are converted by changing the position of a shift lever and that reduces hydraulic pressure so that it is lower than the line pressure.

As another aspect of the present invention, the present invention provides a method for controlling line pressure of a hydraulic control system for 4-speed automatic transmissions which, when starting to shift from one of second, third or fourth speed of the "D" range where the damper clutch is operated, to another speed thereof, makes the damper clutch control solenoid valve to be at an "OFF" state with the transmission control unit at the initial stage of shift thereby releasing the damper clutch, and makes the valve spool of the high-low pressure valve to be displaced thereby releasing the high-low pressure valve and releasing the pressure control valve, thereby preventing the line pressure to be changed, and which makes the valve of the damper clutch control solenoid valve to be at an "ON" state at the middle or last stage of shift, thereby making the valve spool of the damper clutch control valve to be displaced thereby engaging the damper clutch and then making the valve spool of the high-low pressure valve to be displaced, whereby a part of the oil supplied from the oil pump is returned to the oil pan 300 by the pressure control valve thereby accomplishing the line pressure control.

BRIEF DESCRIPTION OF THE DRAWINGS

FIG. 5 shows hydraulic pressure generated by a damper clutch and main control pressure when the main control pressure is varied.

DESCRIPTION

The present invention will now be described in detail with reference to the accompanying drawings.

Figure 1:
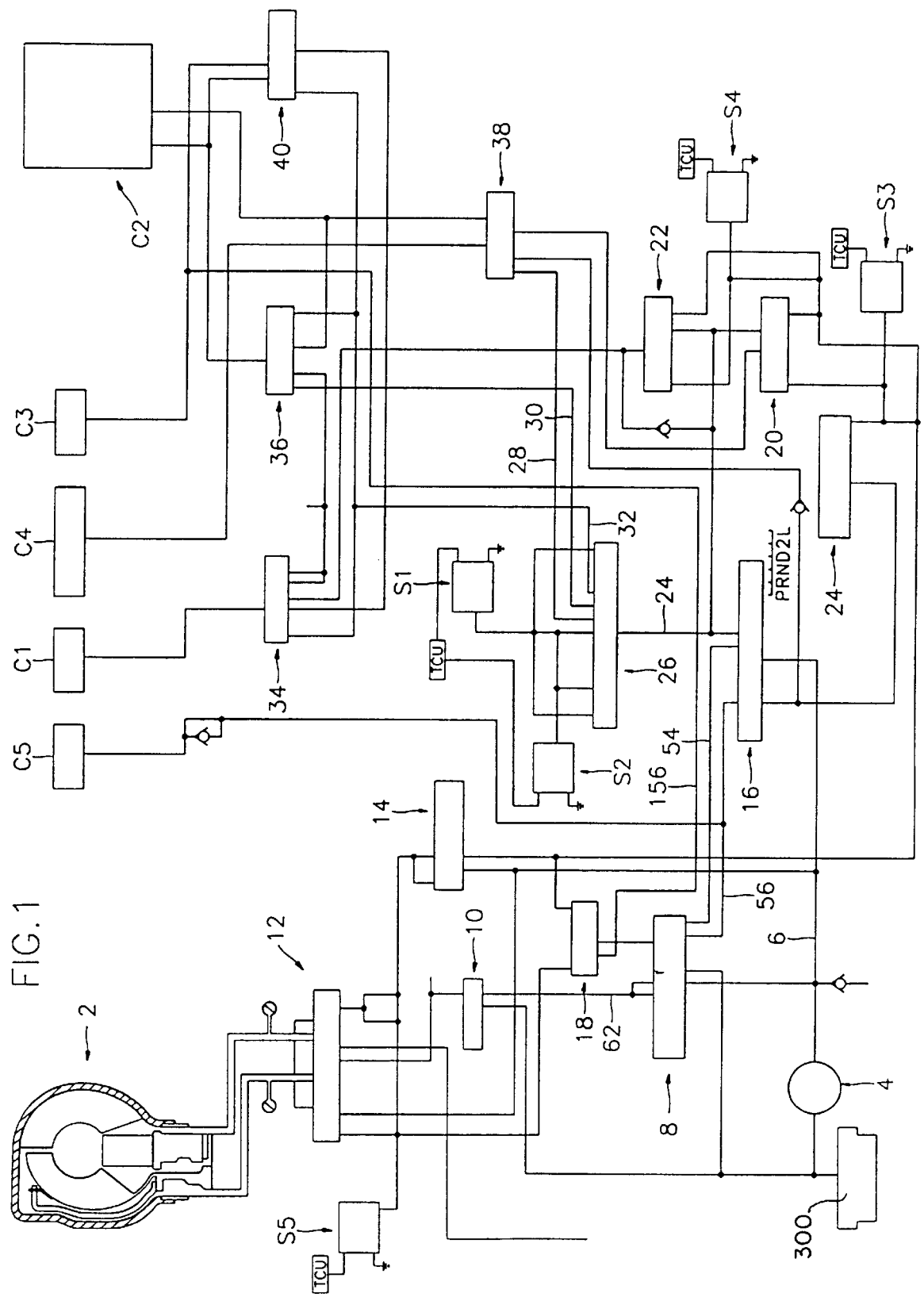
FIG. 1 is a schematic circuit diagram of a hydraulic control system in accordance with the present invention.
Figure 2:
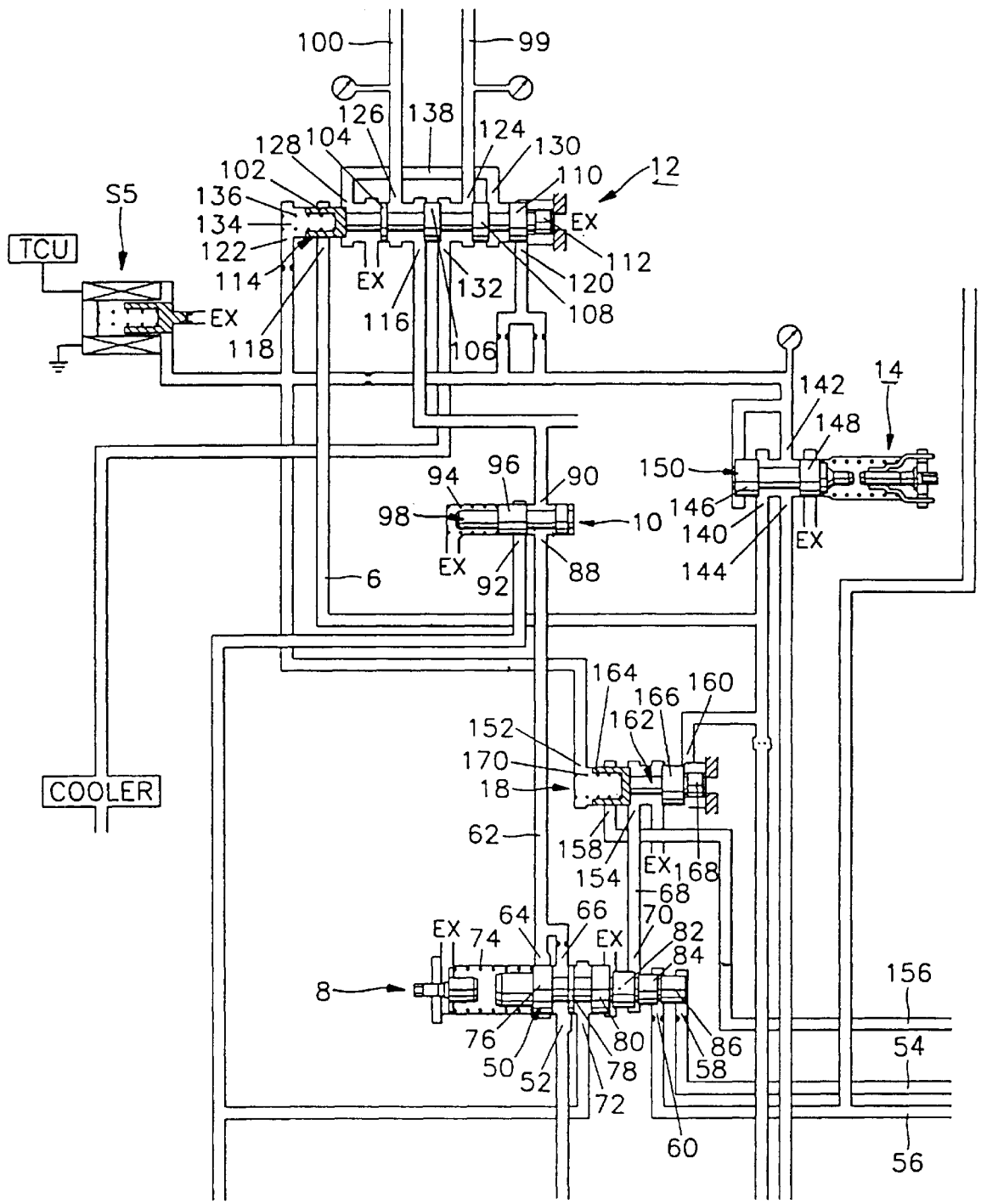
FIG. 2 is a circuit diagram of a line pressure control and damper clutch control portion in accordance with the present invention.

FIG. 1 is a first preferred embodiment of a hydraulic control system for 4-speed automatic transmissions. Gear shifting of the hydraulic control system in the present invention is accomplished by solenoid valves that are either turned on or turned off by a transmission control unit (TCU) in response to the degree that the throttle valve is opened and to car speed.

When the engine starts to run, a torque converter 2 moves together therewith to turn an input shaft of the transmission gear box, and an oil pump 4 operates to generate oil pressure. Part of the oil pressure produced at this point passes to a pressure control valve 8, a torque converter control valve 10, and a damper clutch control valve 12 along a line pressure conduit 6, and the other part of the oil pressure flows to a reducing valve 14 and a manual valve 16. The hydraulic pressure flowing to the pressure control valve 8 is regulated to be provided to the torque converter control valve 10 and damper clutch control valve 12. The hydraulic pressure supplied to the reducing valve 14 is reduced so that it is lower than the main control pressure to be provided to the damper clutch control valve 12, a high-low pressure valve 18, first and second pressure control valves 20 and 22, and an N-R control valve 24.

When the speed change gear assembly comes into the driving "D" arrangement, the manual valve 16, whose ports are converted by selecting the position of the shift lever, provides hydraulic pressure to a shift control valve 26 via a drive pressure conduit 54. The shift control valve 26 supplies hydraulic pressure respectively to a 2nd–4th/3rd–4th speed shift valve 34, a 2nd–3rd/4th–3rd speed shift valve 36, a 1st–2nd speed shift valve 38, and an end clutch valve 40 through 2nd, 3rd, 4th speed conduits 28, 30 and 32 by first and second shift control solenoid valves S1 and S2 controlled by the TCU.

The hydraulic pressure provided respectively to the 2nd–4th/3rd–4th speed shift valve 34, 2nd–3rd/4th–3rd speed shift valve 36, 1st–2nd speed shift valve 38, and end clutch valve 40 circulates along with the hydraulic pressure provided to the first and second pressure control valves 20 and 22 controlled by first and second pressure control solenoid valves S3 and S4 to supply drive pressure to first, second, third and fourth frictional elements C1, C2, C3 and C4, whereby gear shifting is accomplished.

A fifth frictional element C5 actuated while reversing is provided with hydraulic pressure directly from the manual valve 16 when reversing the car.

A line pressure control device incorporating the present invention includes the pressure control valve 8 varying main control pressure when the gear assembly comes into an "N" driving, "D", or "R" driving arrangement, the torque converter control valve 10 regularly controlling pressure of the torque converter, and the damper clutch control valve 12 varying hydraulic pressure generated from the oil pump to either turn on or turn off the damper clutch of the torque converter.

The line pressure control device also includes the reducing valve 14 connected to the manual valve 16 whose ports are converted by selecting the position of the lever and which reduces hydraulic pressure so that it is lower than main control pressure, and the high-low pressure valve 18 is controlled by a damper clutch solenoid valve S5 and regulates the main control pressure of the pressure control valve 8 by the hydraulic pressure supplied from the end clutch.

The pressure control valve 8 functions by controlling the main control pressure produced from the oil pump and has a valve body and a valve spool 50 moving inside thereof.

The valve body of the pressure control valve 8 includes a first port 52 communicating with the line pressure conduit 6, a second port 58 and a third port 60 respectively communicating with a drive pressure conduit 54 and a reverse pressure conduit 56, and a fourth port 64 and fifth port 66 providing a conduit 62 with the main control pressure provided from the first port 52. The valve body further includes a sixth port 70 communicating with the high-low pressure valve 18 by way of a conduit 68, and a seventh port 72 for partially returning the hydraulic pressure provided through the first port 52.

The valve spool 50 of the pressure control valve 8 is suspended by an elastic member 74, and includes a first land 76 selectively closing the fourth port 64, a second land 78 permitting discharge of main control pressure by the leftward movement of the valve spool 50, and a third land 80 separating pilot pressure from pump suction pressure. The valve spool 50 also includes a fourth land 82 operating to the surface on which the hydraulic pressure of the sixth port 70 acts, a fifth land 84 and a sixth port 86 operating to the surface on which the hydraulic pressure of the third and second ports 60 and 58 acts.

The pressure control valve 8 is controlled with the movement of the valve spool 50 by the hydraulic pressure provided to the first port 52 and to the second, third and seventh ports 58, 60 and 72.

The torque converter control valve 10 joined to the conduit 62 that connects the damper clutch control valve 12 to the pressure control valve 8 to regulate the pressure of the torque converter includes a valve body having a first port 88, a second port 90, and a third port 92, and a valve spool 98 having a land 96 suspended by an elastic member 94 to make part of the pressure of the first port 86 head back to the third port 92.

The valve spool of the damper clutch control valve 12 is designed to be moved by the damper clutch control solenoid valve S5 controlled by the TCU. The damper clutch control valve 12 is connected to the torque converter through a clutch-operating conduit 99 and a clutch-releasing conduit 100 to operate the damper clutch in the torque converter.

The damper clutch control valve 12 includes a valve spool 114 having first, second, third, fourth, fifth and sixth lands 102, 104, 106, 108, 110 and 112, and a valve body having first, second, third, fourth, fifth, sixth, seventh, eighth and ninth ports 116, 118, 120, 122, 124, 126, 128, 130 and 132. The damper clutch control valve 12 also includes an elastic member 136 in a pressure chamber 134 in front of the first land 102 to keep the valve spool 114 on the right end.

The first port 116 is supplied with line pressure regulated by way of the conduit 62 extending to the pressure control valve 8, and the second port 118 is provided with line pressure 6 by way of the conduit 6 connected to the oil pump. In addition, the third port 120 is designed to be provided with hydraulic pressure reduced through the reducing valve 14, and the fourth port 122 communicates with the damper clutch control solenoid valve S5. The fifth and sixth ports 124 and 126 communicate with the torque converter by way of the clutch-operating conduit 99 and clutch-releasing conduit 100 respectively, and the seventh port 128 communicates with the eighth port 130 by way of a conduit 138.

The reducing valve 14 includes a valve body having a first port 140 communicating with the line pressure conduit 6, and second and third ports 142 and 144 providing the damper clutch control valve 12 with part of the hydraulic pressure flowing to the first port 140. The reducing valve 14 also includes a valve spool 150 having first and second lands 146 and 148 varying each opening degree of the above ports. The high-low pressure valve 18 is joined to the conduit 68 connecting the damper clutch control solenoid valve S5 to the pressure control valve 8. Its valve body has a first port 152 to communicate with the damper clutch control solenoid valve S5, a second port 154 communicating with the pressure control valve 8, a third port 158 connected to a conduit 156 communicating with a hydraulic supply line of the third frictional element C3, and a fourth port 160 communicating with the line pressure conduit 6.

A valve spool 162 formed inside of the valve body has a first land 164 for getting the third port 158 opened or closed, a second land 166 on which the hydraulic pressure of the fourth port 160 acts and alternately opens or closes an exit Ex, a third land 168 disposed on one side of the second land 166, and an elastic member 170 interposed between the first land 164 and the valve body.

The high-low pressure valve 18 is then actuated by an ON/OFF control of the damper clutch control solenoid valve S5, and hydraulic pressure provided to the third frictional element C3 at 3rd and 4th speeds stands still in the third port 158 by way of the conduit 156. When the hydraulic pressure acting on the first port 152 is exhausted by turning on the damper clutch control solenoid valve S5, the valve spool 162 compresses the elastic member 170 by the hydraulic pressure provided to the fourth port 160 by way of the conduit 6, and is moved to the left end to permit the third port 158 to communicate with the second port 154.

The hydraulic pressure is then applied to the pressure control valve 8 through the conduit 68, and acts on the right side of the fourth land 82 of the valve spool 50 to move the valve spool 50 to the left end, which makes part of the hydraulic pressure of the first port 52 return to the seventh port 72 to regulate the line pressure.

In the process for controlling line pressure in the pressure control device of the hydraulic control system mentioned above, the hydraulic pressure produced from the oil pump 4 to the manual valve 16 is provided to the pressure control valve 8 by way of the drive pressure line 54 in "D", "N", "2" and "L" ranges, which can be seen by viewing FIG. 1. The hydraulic pressure acts on the sixth land 86 of the pressure control valve 8 through the second port 58, and then moves the valve spool 50 to control the line pressure.

In the "R" range, the hydraulic pressure produced from the oil pump 4 to the manual valve 16 is provided to the reverse pressure conduit 56 and acts on the right side of the fifth land 84 of the valve spool 50 through the third port 60 of the pressure control valve 8 to move the valve spool 50 in such a manner that the line pressure may be controlled.

Figure 3:
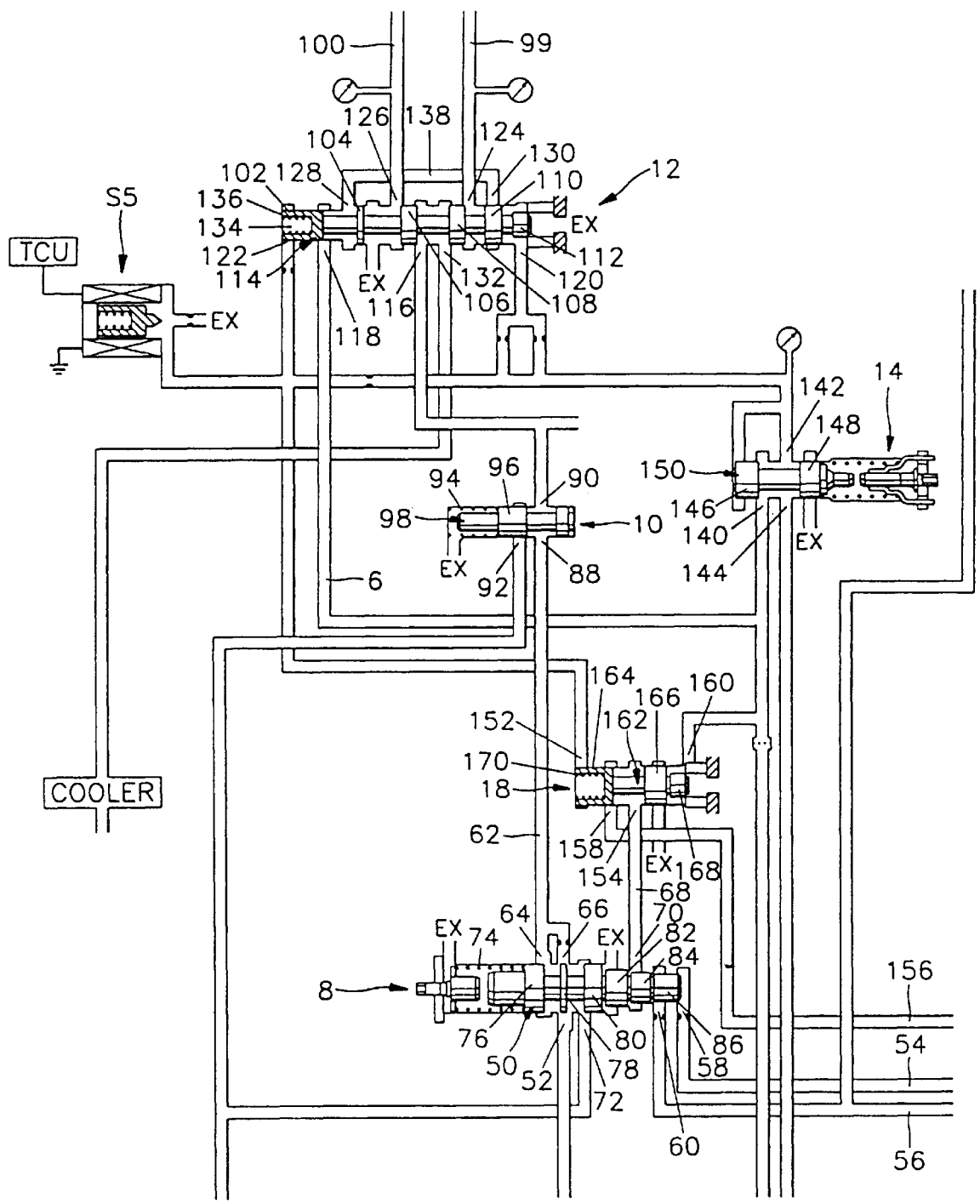
FIG. 3 is a circuit diagram showing the operating condition of the present invention.
Figure 4:
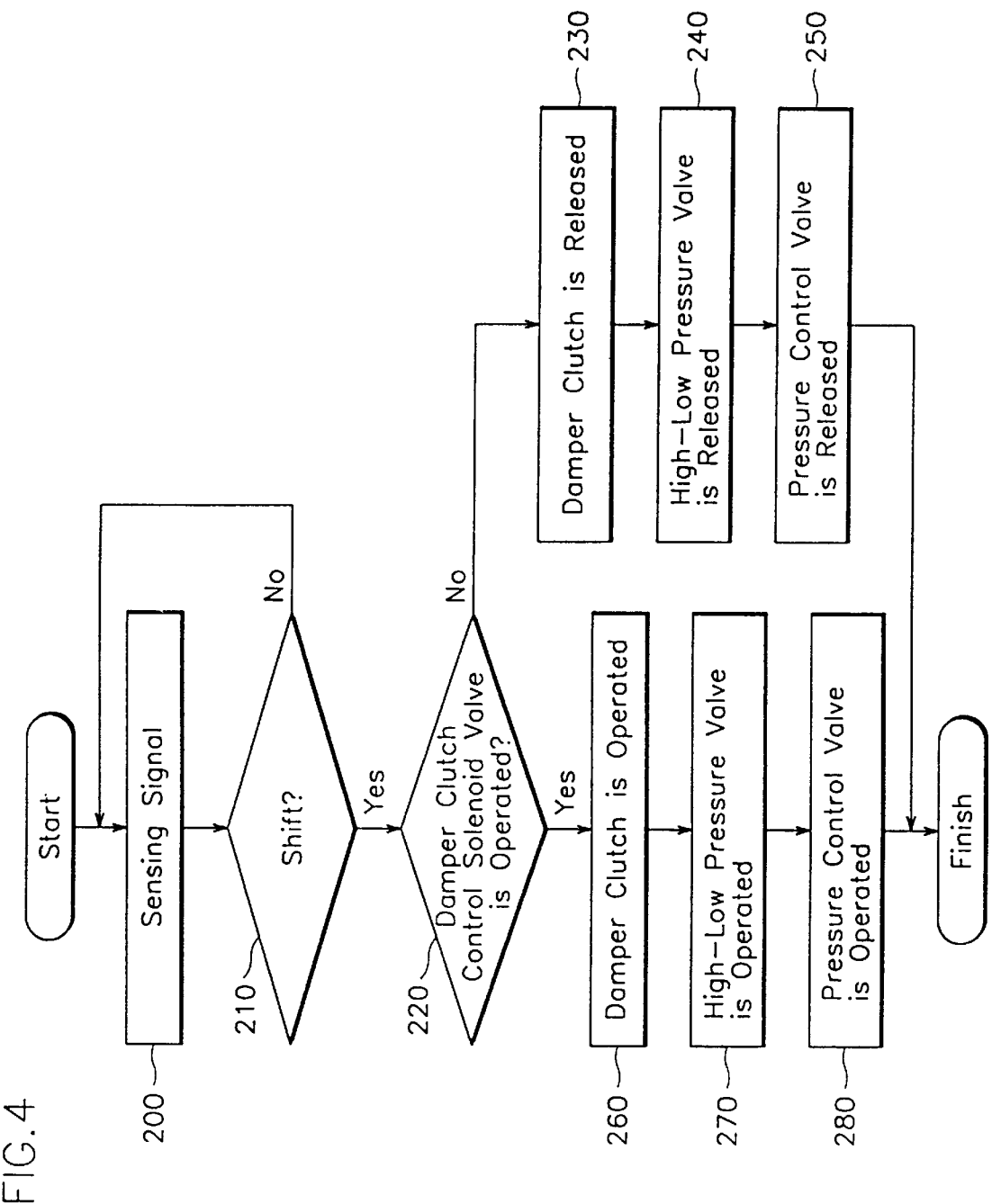
FIG. 4 is a flow chart depicting a method for controlling main control pressure in accordance with the present invention.

In FIGS. 3 and 4, it will be described hereinbelow that the line pressure can be changed by using the hydraulic pressure supplied to the third friction element C3 while driving.

That is, part of the hydraulic pressure supplied to the third friction element C3 is supplied to the third port 154 of the high-low presure valve 18 through the conduit 156 and then stands by therein.

In this state, at the second, third or fourth speed of the "D" range where the damper clutch operates, the transmission control unit(TCU) receives signals from each sensor (S200) and then decides whether to shift to another speed stage (S210) or not.

After the TCU decides to shift to another speed stage in the above step(210), it decides whether to operate the damper clutch solenoid valve or not(S220). At the inital time of shifting from the second, third or fourth of the "D" range where the damper clutch operates, the damper clutch control solenoid valve S5 is controlled from the ON state to the OFF state.

Then, the damper clutch is released S230 and the valve spool 162 of the high-low pressure valve 18 moves to the right as viewed from the drawing so that the high-low pressure valve 18 is released S240, thereby cutting off the hydraulic pressure supplied to the sixth port 70 of the pressure control valve 8, whereby the pressure control valve 8 is released S250 thereby stopping a change in pressure.

This stopping in the change of line pressure, during releasing the damper clutch for shifting, prevents the engine from instantly running up according to the sudden releasing of the damper clutch, thereby improving shift quality and reducing fuel consumption.

At the middle and last stages where the shift is accomplished in a state where changes in line pressure are stopped at the initial stage, the damper clutch control solenoid valve S5 is controlled to be at an ON state from the OFF state.

Then, the valve spool 114 of the damper clutch control valve 12 moves to the right as viewed from FIG. 3 so that the hydraulic pressure of the conduit 6 is supplied to the damper clutch through the bypass conduit 138 and clutch-operating conduit 99 thereby operating the damper clutch S260 and, since the pressure of the first port 152 is reduced, the valve spool 162 of the high-low pressure valve 18 moves to the left as viewed from the drawing S270 thereby communicating the third port 158 and the second port 154 with each other, whereby the hydraulic pressure supplied to the conduit 156 is supplied to the sixth port 70 of the pressure control valve 8 through the conduit 68 connecting the pressure control valve 8 and high-low pressure valve 18 and acts on the right side of the fourth land 82 of the valve spool 50 thereby operating the valve spool 50 S280 and returning the oil supplied from the oil pump 4, to the oil pan 300.

That is, when shifting from the second, third or fourth speed of the "D" range where the damper clutch is operated to another shift range when the damper clutch is released, the variation of the line pressure stops so that the engine load increases thereby preventing the run-up of the engine, and when the shift is completed, the line pressure is changed again.

When the damper clutch control solenoid valve S5 is controlled to be at an ON state, the valve spool 114 of the damper clutch control valve 12 moves to the left faster than the valve spool 162 of the high-low pressure valve 18. This is because the outer diameter of the sixth land 112 of the damper clutch control valve 12 is smaller than that of the third land 168 of the high-low pressure valve 18 thereby increasing the working area of the fifth land 110 of the damper clutch control valve 12 on which the hydraulic pressure acts.

The release of the damper clutch raises the line pressure, and the operation of the damper clutch drops the line pressure thereby achieving a variation in line pressure.

The actuating hydraulic pressure of the third frictional element C3 first rises during gear shifting and rises a second time after gear shifting, which enables hydraulic pressure to be supplied to each part in regular order. The line pressure can be reduced to a stable level through the above steps of the present invention.

As mentioned above, the reduction in the line pressure made by controlling the duty ratio of the clutch control solenoid valve at 3rd and 4th speeds of the "D" range may greatly decrease load applied to the oil pump and cut down on fuel consumption. In particular, during shifting from the shift range where the damper clutch is operated to another shift range, the variation of the line pressure stops at the initial stage of shift and the line pressure is changed at the middle or last stage of the shift thereby preventing the run-up of the engine and making variations in line pressure steady, thereby improving shift quality and power transmission efficiency.

While this invention has been described in connection with what is presently considered to be the most practical and preferred embodiments, it is to be understood that the invention is not limited to the disclosed embodiments, but, rather, is intended to cover various modifications and equivalent arrangements included within the spirit and scope of the appended claims.

What is claimed is:

1. A device for controlling the line pressure of a hydraulic control system for a 4-speed automatic transmission including a plurality of valves alternately transmitting rotating force of a torque converter to each gear part by controlling a plurality of frictional elements with hydraulic pressure generated from an oil pump in response to forward and reverse speeds, said device comprising:

a damper clutch control valve varying the hydraulic pressure generated from the oil pump to control a damper clutch of the torque converter;

a torque converter control valve regularly controlling the pressure of the torque converter;

a pressure control valve varying the line pressure during shifting gears to a neutral "N", drive "D", or reverse "R" range;

a high-low pressure valve controlled by a damper clutch solenoid valve and line pressure, and supplied with a part of the hydraulic pressure provided to the frictional elements actuated at 3rd and 4th speeds of the "D" range to regulate the line pressure of said pressure control valve; and a reducing valve connected to a manual valve where said manual valve ports convert by changing a shift lever position and where said reducing valve reduces the hydraulic pressure to lower than the line pressure.

2. The device as set forth in claim 1, wherein said high-low pressure valve includes a valve body and a valve spool;

said valve body having a first port communicating with the damper clutch control solenoid valve, a second port communicating with the pressure control valve, a third port provided with the hydraulic pressure provided to the frictional elements actuated at 3rd and 4th speeds of the "D" range, and a fourth port provided with the line pressure; and said valve spool having a first land controlling access to the third port, a second land where the line pressure of the fourth port actuates on simultaneously by alternately controlling access to an exit, a third land formed on one side of said second land, and an elastic member suspended between said first land and the valve body.

3. A method of controlling line pressure when shifting from one speed of the D range to another speed thereof for a 4-speed automatic transmission having a damper clutch, a damper clutch control solenoid valve, a damper clutch control valve, a high-low pressure valve, a pressure control valve, and a reducing valve, comprising the steps of:

positioning the damper clutch control solenoid valve to an "OFF" state at an initial stage of shift thereby releasing the damper clutch;

displacing a valve spool of the high-low pressure valve to actuate the high-low pressure valve;

ceasing the flow of hydraulic pressure from the high-low pressure valve to the pressure control valve thereby actuating the pressure control valve;

supplying to the damper clutch control valve hydraulic pressure reduced by the reducing valve to lower than line pressure;

positioning the damper clutch control solenoid valve to an "ON" state at the middle or last stage of shift thereby engaging the damper clutch;

supplying hydraulic pressure to the damper clutch from an oil pump, thereby reducing the hydraulic pressure supplied to the high-low pressure valve;

adjusting the high-low pressure valve to allow ports to communicate with one another by displacement of the valve spool, thereby allowing hydraulic pressure supplied to the high-low pressure valve to communicate with the pressure control valve; and draining part of the hydraulic pressure supplied to the pressure control valve from the oil pump.

* * * * *